United States Patent [19]
Rossi

[11] Patent Number: 5,482,751
[45] Date of Patent: Jan. 9, 1996

[54] FIBROUS PRODUCT AND METHOD THEREOF WITH THERMOPLASTIC POLYMERIC IMPREGNANT

[75] Inventor: Robert J. Rossi, Spartanburg, S.C.

[73] Assignee: Spartan Felt Company, Inc., Spartanburg, S.C.

[21] Appl. No.: 394,557

[22] Filed: Feb. 27, 1995

Related U.S. Application Data

[63] Continuation of Ser. No. 4,955, Jan. 15, 1993, abandoned.

[51] Int. Cl.$^6$ ............................................. B32B 5/10
[52] U.S. Cl. ..................... 428/37; 428/34.5; 428/34.6; 428/34.7; 428/34.9; 428/36.1; 428/36.3; 428/36.4; 428/57; 428/60; 428/66.6; 428/80
[58] Field of Search .................................. 428/34.5, 34.6, 428/34.7, 34.9, 36.1, 36.3, 36.4, 37, 57, 60, 64, 80

[56] References Cited

U.S. PATENT DOCUMENTS 4,927,432  5/1990  Budinger et al. ..................... 51/298

Primary Examiner—Patrick J. Ryan
Assistant Examiner—Richard C. Weisberger
Attorney, Agent, or Firm—Dority & Manning

[57] ABSTRACT

An improved article of manufacture and method thereof utilizing a fibrous structure of initially discrete layers, each having first and second sides. At least one side of each layer is rough and the structure has a shrinkage of no more than about 2 percent. The structure is impregnated with a thermoplastic-type polymeric material, and in the final structure there is no visible layer separation.

4 Claims, 4 Drawing Sheets

FIBROUS PRODUCT AND METHOD THEREOF WITH THERMOPLASTIC POLYMERIC IMPREGNANT

This is a continuation of application Ser. No. 08/004,955, filed Jan. 15, 1993, which was abandoned upon the filing hereof.

BACKGROUND OF THE INVENTION

The present invention relates generally to fibrous products and a method of making same, and more particularly to an improved polishing product and method of manufacture thereof.

Products made in accordance with the present invention can be utilized for a number of various applications such as polishing, wicking and the like. The present application describes the improved product and method with respect to a polishing product, such as utilized for glass polishing, but it should be understood by one of ordinary skill in the art that there are a number of suitable applications for the present invention, including but not limited to those set forth above.

Many attempts have heretofore been made to fabricate pads for polishing and/or grinding of various and sundry shapes and materials to accommodate for the wide variety of uses noted above, and in general, have succeeded in affording some economic and/or technical improvement in the then state of the art processes. Though such improvements have heretofore been made, problems continue to exist for various and sundry reasons. Notably, needled natural and synthetic fibrous felts have been produced and utilized as polishing pads though historically such products have been lacking in uniformity of density, porosity, and the like. Furthermore, historically there have been limits to the thickness of such needled fibrous products though attempts have been made to tack plural layers together to build up a thicker composite polishing pad.

Other attempts have been made to produce composite pads in which discrete fibrous layers have been adhesively secured together. Again, the adhesive interfacial layers present a different effect in the working of abrasives or the like across a work surface than the fibrous pad, leading to possible changes in surface characteristics. Likewise, adhesive bonds are subject to fail, leading to delamination with same attendant results as noted above.

In recent years, following at least the advent of the poromeric synthetic leather materials the fibrous pads or substrates have been impregnated with porous elastomeric materials. The elastomeric materials employed have often been urethane based and have been variously applied to the fibrous materials from both solvent and aqueous systems.

Currently, polishing products such as wheels, and the like, are manufactured from non-woven substrates by die cutting to the desired shape or by lamination with adhesive between adjacent layers of material followed by cutting the substrate to the appropriate shape. The laminating process is more efficient from a material standpoint in that there is little if any wasted substrate material. In addition, the laminating process allows products or wheels to be constructed that have a greater thickness than can be manufactured by die cutting unitary substrates. In the die cutting of unitary substrates, there is a great deal of wasted material and there are limitations of the thickness of the final product that can be manufactured. However, a wheel from a needled substrate is much less susceptible to coming apart during polishing or grinding operations because it is of one piece construction.

A disadvantage of laminated polishing products such as spiral wound wheels is that in the prior art, adhesive has been required to maintain the wheel or polishing product in a wound state. It has been found that the adhesive layers may act as a barrier to uniform wicking of slurries or impregnation in a laminated product and may also pick up particles of the article being worked or large particles of abrasives and scratch the surface of the article being polished or ground.

In one conventional process of manufacturing spiral wound polishing wheels, a layer of fibrous substrate material is provided with an adhesive applied to one side of the material. The material is then tightly wound and the roll is placed in an oven for a period of time to allow the adhesive to cure. The roll material is then sliced and finished. Another known process of manufacturing a spiral wound polishing wheel is to cast a film of resin on a sheet of silicone paper. Then a fibrous substrate material is provided and the film is laid down on one side of the substrate. The roll is wound so that the film of adhesive is between adjacent layers of the roll. After processing, wheels are then cut from the roll. Both of these methods of forming a spiral wound wheel suffer from the disadvantages discussed above.

SUMMARY OF THE INVENTION

The present invention recognizes and addresses the foregoing disadvantages, and others of prior art constructions and methods.

Accordingly, it is an object of the present invention to provide an improved article of manufacture.

It is another object of the present invention to provide an improved method of producing an article of manufacture.

It is another object of the present invention to provide an improved fibrous article and method of making same.

It is another object of the present invention to provide an improved spiral wound article of manufacture and method of making same for use in polishing and/or grinding glass and the like.

It is another object of the present invention to provide an improved poromeric laminated article without adhesive between adjacent layers.

It is yet another object of the present invention to provide an improved spiral wound article without adhesive between adjacent layers.

Another object of the present invention is to provide an improved fibrous product for polishing and/or grinding of glass, soft metals, ceramics or the like which product is impregnated with a polymeric composition that is thermoplastic in nature.

These and other objects are achieved by providing an improved article of manufacture comprising a fibrous structure of initially discrete layers, each layer having first and second sides. At least one side of each layer is rough and the structure is made from fibers or a fiber blend which has a shrinkage of no more than about 2 percent. The structure is impregnated with a polymeric material characterized as thermoplastic. In a preferred embodiment, the structure is comprised of a blend of pre-shrunk fibers, and at least one of the first and second sides of each discrete layer has a roughened surface and with an opposite side calendered.

These and other objects are also achieved in one embodiment by providing a process of manufacturing articles including the steps of winding a planar fibrous structure having a shrinkage of not more than about 2 percent upon itself to form a spiral wound roll, one side of the structure having a rough surface and the opposite side of the structure having a smooth surface. The process includes the further step of slicing, die cutting or otherwise cutting the spiral wound roll into a plurality of individual articles, impregnating the individual articles with a polymeric material having thermoplastic characteristics and curing the individual articles.

Likewise, the entire roll of layered fibrous material may be impregnated with the thermoplastic type polymer and cured, after which the product can be finished and used or cut into a desired shape and finished. Still further, roll formation is not necessary in that the layers can be flat pressed together to achieve a coherent, structurally sound product without the need for adhesives, though in pressing both sides of the layers can be rough.

These and other objects are accomplished by providing a method of manufacturing articles that comprises laminated strips of fibrous substrate with a shrinkage of not more than 2 percent and at least one side rough.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
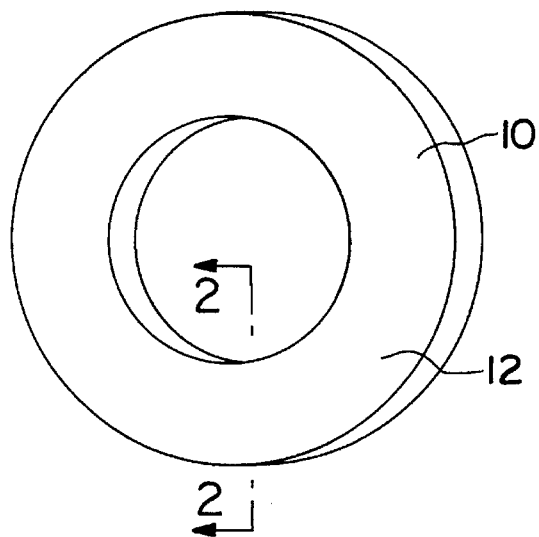
FIG. 1 illustrates a perspective view of a prior art laminated polishing product.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Figure 2:
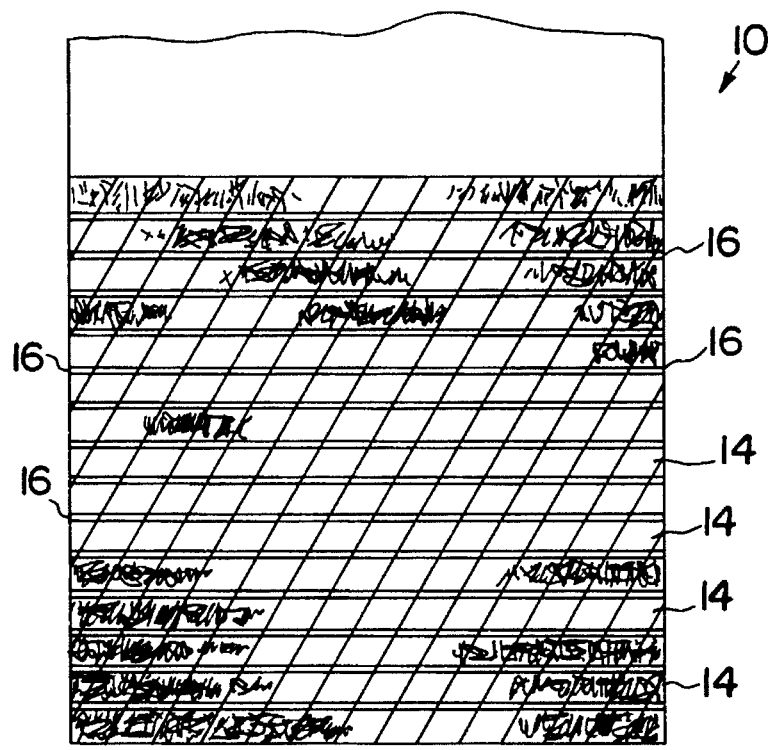
FIG. 2 is a cross-section of FIG. 1 taken along lines 2—2 illustrating the adhesive between layers in a prior art polishing product.

Referring to FIGS. 1 and 2, a prior art laminated, and in this case, spiral wound type polishing product is illustrated generally at 10. This product is constructed as a wheel with an internal diameter for being placed on a polishing machine and a face 12 for polishing products such as glass mirrors and the like. Referring to FIG. 2, which is a cross-section of FIG. 1 taken along lines 2—2, it can be seen that wheel 10 consists of a number of discrete layers 14 of fibrous material such as non-woven polyester substrate. Separating each layer 14 is a layer of adhesive 16 utilized to bond the layers of fibrous substrate 14 together. The polishing wheel of FIGS. 1 and 2 may be formed in the manner as set forth in the background of the invention above. As can be seen from FIG. 2, the fibers of the individual layers 14 are separated by adhesive layer 16. Fibrous substrate for the production of the product illustrated in FIG. 1 has routinely been produced by some needling operation followed by needling and impregnation or adhesive joining of the layers after impregnation. The polishing product illustrated in FIG. 1 is conventionally impregnated with an elastomeric material such as a urethane to form a poromeric polishing product.

Prior art wheels such as depicted in FIG. 1 have also been produced by needling adjacent fibrous layers into a composite structure as noted above followed by impregnation with a thermoplastic type polymer such as a urethane and curing. While products of this nature are generally successful, the needling process adds to cost of the product and presents certain physical size limitations as discussed hereinbefore.

Figure 3:
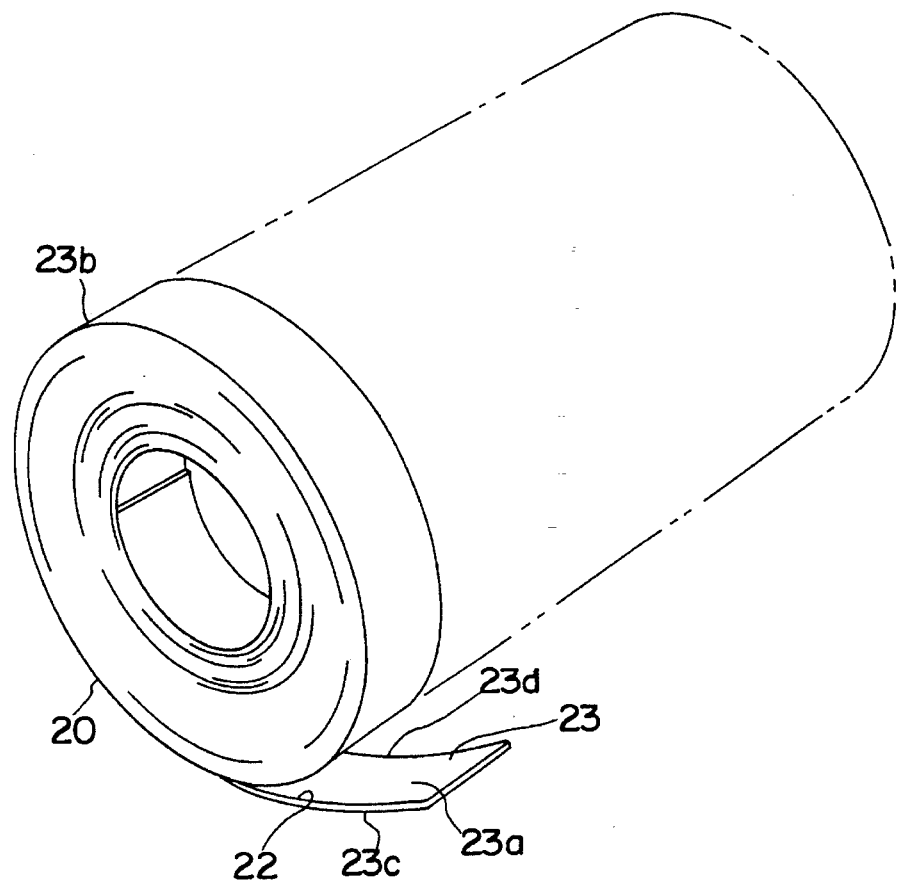
FIG. 3 illustrates a roll of fibrous substrate in accordance with an embodiment of the present invention.

Referring to FIG. 3, a roll of material 20 is illustrated in accordance with one preferred embodiment of the present invention. A sheet of fibrous substrate 22 is wound upon itself to form roll of fibrous material 20. The sheet may be of any desired length and width. The sheet 22, when wound, comprises discrete layers 23 which have been produced by a conventional process. Layers 23 of sheet 22 have sides 23a and 23b and ends 23c and 23d. The sheet may be wound on a core such as a corrugated tube to provide for uniform winding. The core serves as a starting point for the internal diameter as well as serving as a sleeve for placement of the roll on a slicing machine. In forming roll 20, adequate tension is imparted during the winding process to achieve a tight wind without elongation of sheet 22 during which fibers protruding from a rough side, e.g., 23a, contact an opposite side 23b. In a most preferred embodiment, opposite side 23b is calendered. The roll may then be held together with tape or wrap to secure it for slicing and impregnation.

Figure 6:
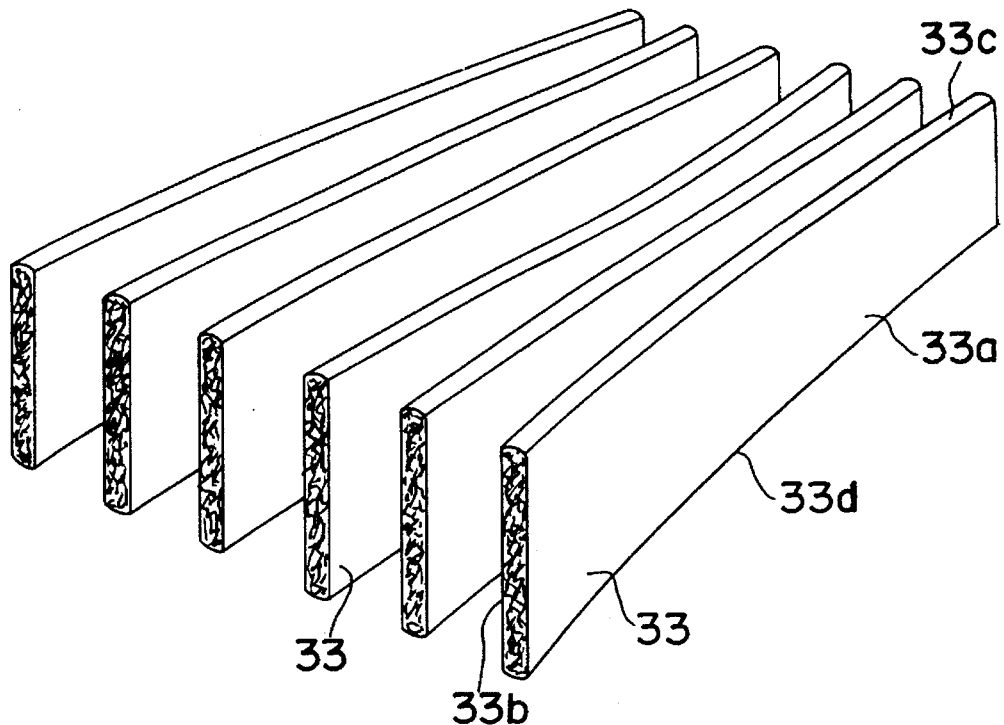
FIG. 6 is a perspective view of strips of material in accordance with an embodiment of the present invention.
Figure 7:
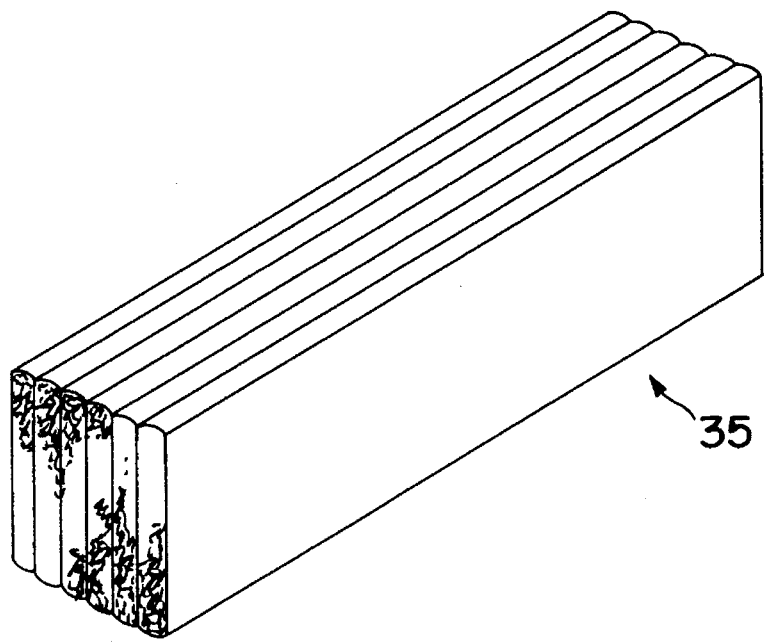
FIG. 7 is a perspective view of the strips of FIG. 6 after being pressed together.

In another embodiment, as illustrated in FIGS. 6 and 7, slices of substrate from a roll or sheet of material such as 22 may be cut to form strips 33 or the like. Strips 33 have sides 33a and 33b and ends 33c and 33d. The strips 33 should be prepared in the manner as set forth above except both sides can be rough and located adjacent one another as illustrated. As illustrated in FIG. 7, the adjacent layers may then be held together by clamping or the like and pressed to form a product in accordance with the present invention. In either embodiment, once the discrete layers are wound or pressed, impregnated and the ultimate product finished by microgrinding or the like, the layers become indistinguishable.

In accordance with the present invention, at least one side of the substrate should be rough so that a fiber-to-fiber proper engagement between each adjacent two layers or layer portions will result when the substrate is rolled upon itself or the strips are pressed together.

As used herein, rough is intended to mean a surface having fibers protruding therefrom such as would be produced by skiving or the like. No particular manner of obtaining this rough or non-smooth surface is required. Also as used herein, the term "smooth" is intended to mean that the fibers lay down across the surface such as would be obtained by hot calendering, hot pressing or the like. In the spiral wound embodiment, only one rough surface between adjacent layers is suitable. In the laminated strip embodiment, both adjacent surfaces may be rough.

In one embodiment, a roughened or non-smooth surface may be accomplished by calendering both sides of the fibrous substrate and then skiving off an appropriate thickness of the material on one side so that the fibrous substrate will have one face or side skived (rough) and one face or side calendered (smooth). In fact, by such process, two sheets may be produced, each of which has one rough surface and one smooth surface. In such case, the substrate would be wound upon itself or the strips laminated so that the skived surface will be in contact with the calendered surface when wound or laminated.

Another method of obtaining this non-smooth or rough surface is through needling of the non-woven substrate. This could be accomplished by needling from one side of the substrate entirely through the substrate sufficient to cause fibers to protrude from the opposite surface. In this needling embodiment, the side from which the needles enter the substrate is suitable as a smooth surface. Likewise buffing or other operations may be employed to achieve a roughened surface of the layer.

It is important to the present invention that the fibrous substrate have low shrinkage, preferably no more than about 2 percent. In one embodiment, this may be accomplished by the use of pre-shrunk fibers.

Fibrous layers or strips employed in production of substrates in accordance with the present invention may be produced in any suitable fashion such as by carding, conventional production of non-wovens or the like. The fibrous content of the substrate should exhibit low shrinkage preferably no more than about 2 percent, and may include fibers of one size or a blend of fibers of different sizes. Fine deniers are preferred, e.g., in a range of from about one to about 10 denier and most preferably in a range of from about 2 to about 7 denier. Fiber types are generally manmade, though natural fibers such as wool and cotton may be utilized, including blends. Preferred fibers are polyester fibers though other manmade fibers such as polyolefins, polyamides and the like will also work so long as the fibers will withstand a temperature of about 140°–150° F. without melting or shrinkage. In addition, natural fibers or blends may be utilized such as wools or cottons. A suitable fibrous layer according to the present invention has a fiber density of from about 9 to about 65 ounces per square yard and a thickness of from about 150 to about 250 thousandths of an inch. A particularly suitable fibrous layer is a blend of polyester fibers, 66⅔ percent of which have a denier of 2½ and 33⅓ percent of which have a denier of 6, a density of about 9 ounces per square yard, and a thickness of about 100 thousandths of an inch.

Figure 4:
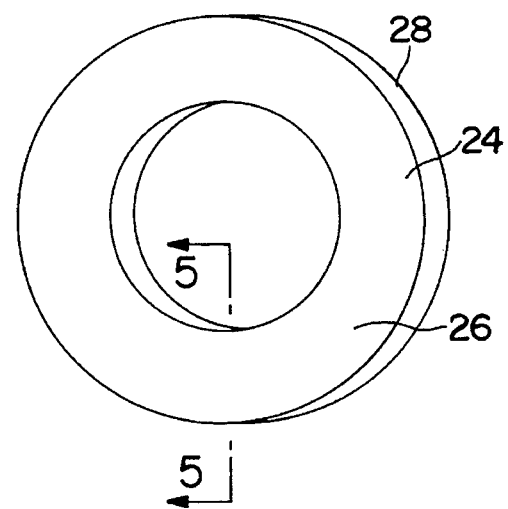
FIG. 4 is a perspective view of a product in accordance with an embodiment of the present invention.
Figure 5:
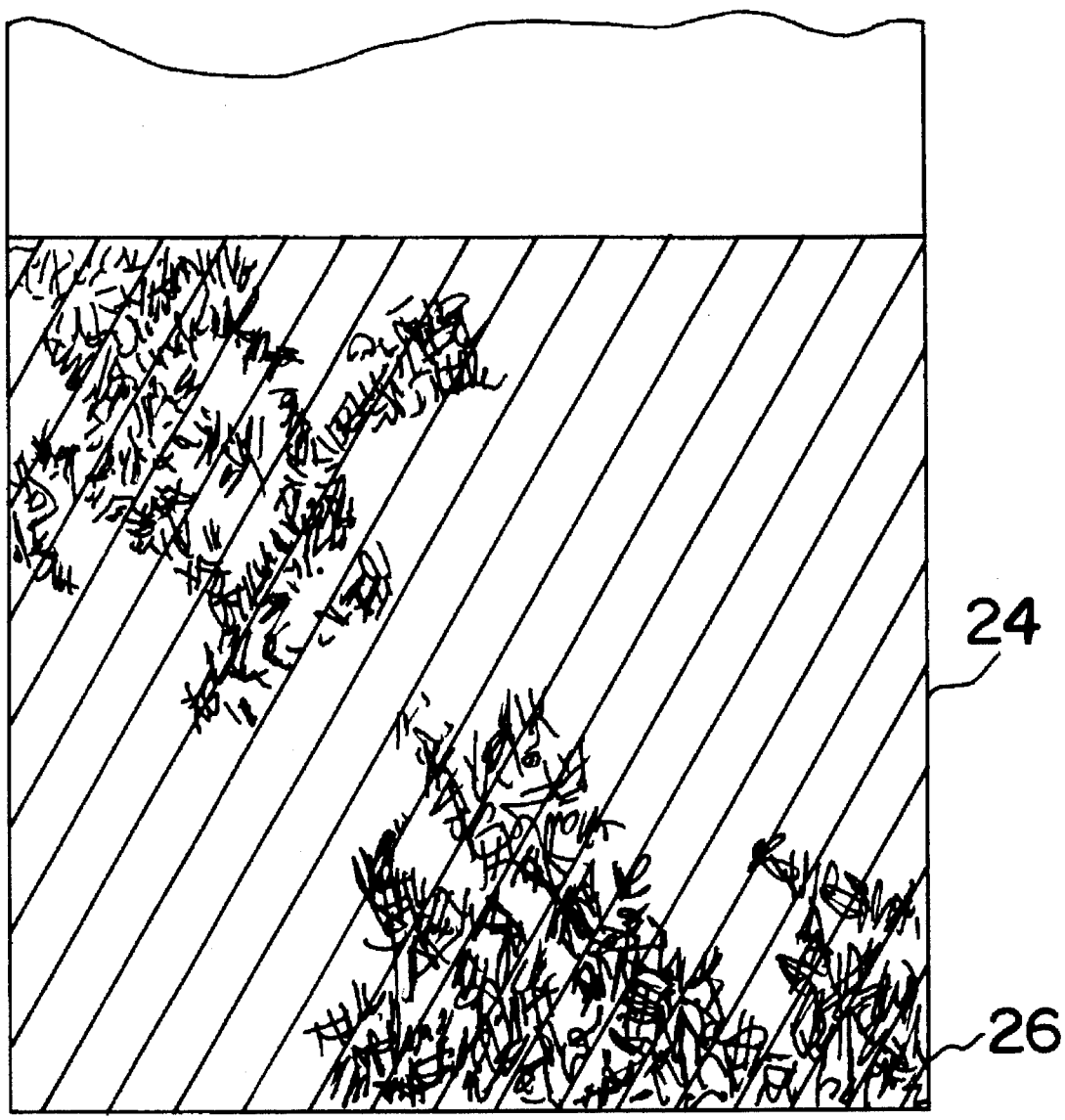
FIG. 5 is a cross-sectional view taken along lines 5—5 of FIG. 4 illustrating an embodiment of the present invention.

In the embodiment of FIGS. 3–5, once the substrate 22 is prepared with one rough surface, it is wound upon itself to form a roll of material with a fiber to fiber contact between the various adjacent layer portions. It is preferred that the winding be tight but not done under such high tension that will elongate the sheets of fibers. One example of a device suitable for accomplishing this type of winding is illustrated in U.S. Pat. No. 1,076,189 to Cameron and Birch, the disclosure of which is hereby incorporated by reference.

Once the material is wound, the roll is held together by tape or the like and may be sliced to produce a plurality of individual wheels or otherwise die cut or the like for a particular desired shape. The individual wheels or shapes are then impregnated with a thermoplastic type polymer, preferably an elastomeric material. The particular impregnant material will depend on the final use of the wheels, but is preferably a urethane impregnant. Examples are provided below to illustrate some preferred impregnant materials.

Referring to FIGS. 4 and 5, one product in accordance with the present invention is illustrated at 24 with a polishing face 26 and an edge 28. As can be seen, no distinction can be recognized between the layers of the product 24 as fibers 26 extend throughout the width of the polishing product. A fiber-to-fiber contact between the initially discrete layers is provided so that the discrete layers are not separated by adhesive layers as in the prior art.

Referring to FIGS. 6 and 7, once the substrate has been prepared with at least one rough surface such as 33b, strips 33 are then pressed together so that there is fiber-to-fiber contact between the various strips. This may be accomplished by any suitable pressing or clamping apparatus. The resultant product 35 may then be die cut or otherwise formed to a desired shape and impregnated and finished as set forth above with regard to the embodiment of FIGS. 3–5. It should be appreciated that in all embodiments, impregnation could occur prior to cutting into the desired shape.

The following examples are provided for a better understanding of the present invention. They illustrate various fiber deniers and impregnation processes that have successfully been utilized.

EXAMPLE 1

A substrate comprised of a blend of 66⅔ weight percent 2½ and 33⅓ weight percent 6 denier low shrinkage polyester fibers was needled through to produce a fuzzy, high friction surface on one surface. The substrate was then tightly wound upon itself to form a spiral wound roll and held together by tape. The roll was then sliced to produce individual wheels. A mixture of the following was prepared:

| | |
|---|---|
| Trisodium phosphate | 0.1 percent |
| $H_2O$ | 24.9 percent |
| Polyurethane, polycarbonate formed from Bisphenol A, phosgene, and a linear polyester of carbonic acid | 20.0 percent |
| Nitrile latex | 20.0 percent |
| Polyurethane, carbonic acid ethyl ester | 30.0 percent |
| Polyaziridine crosslinking agent | 1.0 percent |
| COU, a thickener manufactured by Synthron, Morganton, North Carolina | 4.0 percent |
| Ammonium oxalate | 3.0 percent |

The components were mixed thoroughly for 20 to 30 minutes using a high speed blender. The components were added in descending order. The individual wheels were placed in a bath of the above mixture where the composition impregnated the wheels. The impregnated wheels were then dried in a convection oven at 150° F. for 48 hours or until dry. The wheels were then finished and processed according to desired specifications including turning the inner diameter, outer diameter and sanding or microgrinding both faces of the wheel. When mounted on a glass beveling machine, the wheels successfully polished the glass.

EXAMPLE 2

A non-woven fibrous product was produced and cut into wheels as set forth in Example 1. The following components were then mixed for 20 to 30 minutes using a high speed blender:

| | |
|---|---|
| Polyurethane, carbonic acid ethyl ester | 85.0 percent |
| COU, a thickener manufactured by Synthron, Morganton, North Carolina | 4.0 percent |
| Polyaziridine crosslinking agent | 1.0 percent |
| $H_2O$ | 10.0 percent |
| Ammonium oxalate | 3.0 percent |

The wheels were then impregnated, being careful not to encapsulate the wheel. The wheels were then dried in an oven at 150° F. for 48 hours or until completely dry and finished by turning the inside and outside diameters and sanding the faces as appropriate. The wheels successfully polished mirrors.

EXAMPLE 3

Layers of fibrous substrate were prepared in conventional needling fashion from a blend of polyester fibers of 2½ and 6 denier, 200 thousandths of an inch thick. Thereafter the layers were calendered and one side was then skived to expose fibers and produce two layers, each of which was about 100 thousandths of an inch thick. One layer was then wound tightly onto a mandrel with fibers on the skived side contacting fibers on the calendered side and the layers were held together by tape. The roll of fibrous material was then sliced to produce a wheel and the wheel was impregnated with an elastomeric having the composition as set forth in Example 1 followed by drying. The wheels were then trued and microground. Testing on a beveling machine demonstrated that the wheels performed properly.

EXAMPLE 4

Wheels comprised of a blend of 2½ and 6 denier polyester fiber are prepared as set forth in Examples 1, 2 and 3 above. A mixture of the following components were blended in descending order for 20 to 30 minutes using a high speed blender:

| | |
|---|---|
| Trisodium phosphate | 0.1 percent |
| $H_2O$ | 34.9 percent |
| Polyurethane, polycarbonate formed from Bisphenol A, phosgene, and a linear polyester of carbonic acid | 20.0 percent |
| Nitrile latex | 20.0 percent |
| Polyurethane, carbonic acid ethyl ester | 20.0 percent |
| Polyaziridine crosslinking agent | 1.0 percent |
| COU, a thickener manufactured by Synthron, Morganton, North Carolina | 4.0 percent |
| Ammonium oxalate | 3.0 percent |

The wheels were then impregnated in this bath without encapsulating the wheel. The wheels were dried in a convection oven at 150° F. for 48 hours or until dry. The wheels were then finished as set forth in the above examples, and when tested, polished glass properly.

EXAMPLE 5

Wheels comprising polyester fibers of a blend of 2½ and 6 denier were prepared as set forth in the above examples. The following components were blended in descending order for 20 to 30 minutes using a high speed blender:

| | |
|---|---|
| Trisodium phosphate | 0.1 percent |
| $H_2O$ | 29.9 percent |
| Polyurethane, polycarbonate formed from Bisphenol A, phosgene, and a linear polyester of carbonic acid | 20.0 percent |
| Nitrile latex | 20.0 percent |
| Polyurethane, carbonic acid ethyl ester | 15.0 percent |
| Polyaziridine crosslinking agent | 1.0 percent |
| COU, a thickener manufactured by Synthron, Morganton, North Carolina | 4.0 percent |
| Ammonium oxalate | 3.0 percent |

The wheels were then impregnated by wicking in the bath without encapsulating the wheel. The wheels were then removed and dried in a convection oven at 150° F. for 48 hours or until dry. The wheels were finished and processed as set forth above. Upon testing, the wheels successfully polished glass.

EXAMPLE 6

The same steps as set forth above were carried out using the following chemical formulation blended in the same manner.

| | |
|---|---|
| Trisodium phosphate | 0.1 percent |
| $H_2O$ | 44.9 percent |
| Polyurethane, polycarbonate formed from Bisphenol A, phosgene, and a linear polyester of carbonic acid | 20.0 percent |
| Nitrile latex | 20.0 percent |
| Polyurethane, carbonic acid ethyl ester | 10.0 percent |
| Polyaziridine crosslinking agent | 1.0 percent |
| COU, a thickener manufactured by Synthron, Morganton, North Carolina | 4.0 percent |
| Ammonium oxalate | 3.0 percent |

In the context of the present invention, the polymeric impregnant should assume a thermoplastic character and, as mentioned above, is preferably an elastomer, most preferably a urethane. When looking to end use of the product, hardness of the product comes into play where the work piece to be treated has non-planar surfaces. In this situation, a softer polishing/grinding product is desired or necessary. The same is true for the grinding/polishing of soft metals such as gold. For grinding/polishing other products, however, a harder impregnated fibrous article may be desired. Additional hardness may be obtained by selection of the particular impregnant, or by blending of several polymers. Accordingly, polymeric materials that are thermoset in character may be included in small amounts so long as the overall thermoplasticity of the impregnant remains. Likewise it has been determined that the polymeric impregnant should have a low shrinkage characteristic which is exemplified by the urethanes of the above examples. Further, the polymeric composition can contain minor amounts of other ingredients such as fillers, abrasives, dyes, etc.

While product has been produced as set forth in the examples, it is believed that any low shrink thermoplastic polymeric impregnant may be used to impregnate the wheels, such depending on the final use of the wheels. For example, both aqueous and solvent based polymers are believed to be suitable for certain end uses provided such use low shrink polymers.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. An improved article of manufacture, said article of manufacture comprising:

a fibrous structure of spiral wound layers, said structure having an initial shrinkage of not more than about 2%, each said layer having first and second sides, one of said first and second sides having a surface such that fibers are protruding therefrom and wherein the surface fibers contact an adjacent layer, said layers of said structure having fiber to fiber contact therebetween without being mechanically or adhesively secured together; and said structure being impregnated with a thermoplastic polymeric impregnant.

2. An improved article of manufacture as in claim 1, wherein said thermoplastic polymeric material is elastomeric.

3. An improved article of manufacture as in claim 2, wherein said elastomeric material is a urethane.

4. An article of manufacture as in claim 3, wherein said urethane is water-based.

* * * * *